United States Patent
Shah et al.

(10) Patent No.: US 11,510,416 B1
(45) Date of Patent: Nov. 29, 2022

(54) NATURAL PASTA-FILATA STYLE CHEESE WITH IMPROVED TEXTURE

(71) Applicant: Sargento Foods Inc., Plymouth, WI (US)

(72) Inventors: Kartik Shah, Elkhart Lake, WI (US); Mihir Sainani, Elkhart Lake, WI (US); Donald J. McMahon, Smithfield, UT (US)

(73) Assignee: Sargento Foods Inc., Plymouth, WI (US)

( * ) Notice: Subject to any disclaimer, the term of this patent is extended or adjusted under 35 U.S.C. 154(b) by 0 days.

(21) Appl. No.: 17/178,660

(22) Filed: Feb. 18, 2021

(51) Int. Cl.
| | |
|---|---|
| *A23C 9/12* | (2006.01) |
| *A23C 19/068* | (2006.01) |
| *A23C 19/14* | (2006.01) |
| *A23C 19/032* | (2006.01) |
| *A23C 19/028* | (2006.01) |

(52) U.S. Cl.
CPC ...... *A23C 19/0684* (2013.01); *A23C 19/0285* (2013.01); *A23C 19/032* (2013.01); *A23C 19/14* (2013.01)

(58) Field of Classification Search
CPC ............ A23C 19/0684; A23C 19/0285; A23C 19/032; A23C 19/14
USPC ...................................................... 426/582
See application file for complete search history.

(56) References Cited

U.S. PATENT DOCUMENTS

| | | |
|---|---|---|
| 4,959,229 A | 9/1990 | Reddy et al. |
| 5,629,037 A | 5/1997 | Gaffney |
| 5,750,177 A | 5/1998 | Yee et al. |
| 5,766,657 A | 6/1998 | Farkye et al. |
| 5,876,770 A | 3/1999 | Zaikos et al. |
| 6,177,118 B1 | 1/2001 | Blazey et al. |
| 6,426,102 B1 | 7/2002 | Isom et al. |
| 6,551,635 B2 | 4/2003 | Nielsen |
| 6,623,781 B2 | 9/2003 | Rizvi et al. |
| 6,649,199 B2 | 11/2003 | Bigret |
| 6,902,749 B1 | 6/2005 | Lortal et al. |
| 6,916,496 B2 | 7/2005 | Koka et al. |
| 7,041,323 B2 | 5/2006 | Andersen |
| 7,157,108 B2 | 1/2007 | Bhaskar et al. |
| 7,947,315 B2 | 5/2011 | Kodera et al. |
| 8,263,144 B2 | 9/2012 | Koka et al. |
| 8,628,810 B2 | 1/2014 | Barbano et al. |
| 8,815,322 B2 | 8/2014 | Kilroy |
| 8,993,016 B2 | 3/2015 | Washizu et al. |
| 9,144,249 B2 | 9/2015 | Jolly |

(Continued)

FOREIGN PATENT DOCUMENTS

| | | |
|---|---|---|
| CA | 2579210 | 3/2006 |
| CA | 2558780 | 3/2007 |

(Continued)

OTHER PUBLICATIONS

McMahon et al., Influence of Calcium, pH, and Moisture on Protein Matrix Structure and Functionality in Direct-Acidified Nonfat Mozzarella Cheese, J. Dairy Sci. 88:3754-3763, 2005 (Year: 2005).*

(Continued)

*Primary Examiner* — Brent T O'Hern

(74) *Attorney, Agent, or Firm* — Boyle Fredrickson, SC

(57) ABSTRACT

A natural pasta filata style cheese with improved textural attributes achieved by altering various natural cheeses raking parameters.

13 Claims, 3 Drawing Sheets

(56) References Cited

U.S. PATENT DOCUMENTS

| | | |
|---|---|---|
| 9,232,808 B2 | 1/2016 | Smith et al. |
| 10,258,057 B2 | 4/2019 | Horan et al. |
| 2004/0052904 A1 | 3/2004 | Antonsson et al. |
| 2004/0151801 A1 | 8/2004 | Sorensen et al. |
| 2007/0059399 A1 | 3/2007 | Wiles et al. |
| 2007/0172546 A1 | 7/2007 | Moran et al. |
| 2007/0254064 A1 | 11/2007 | Smith et al. |
| 2008/0050467 A1 | 2/2008 | Schlothauer et al. |
| 2008/0220123 A1 | 9/2008 | Fatum et al. |
| 2008/0299252 A1 | 12/2008 | Fatum et al. |
| 2009/0081329 A1 | 3/2009 | Van Dijk et al. |
| 2009/0214705 A1 | 8/2009 | Ledon et al. |
| 2009/0291167 A1 | 11/2009 | Mornet et al. |
| 2010/0055240 A1 | 3/2010 | Van Dijk et al. |
| 2010/0092609 A1 | 4/2010 | Van Dijk et al. |
| 2011/0104332 A1 | 5/2011 | Remmerswaal et al. |
| 2012/0171327 A1 | 7/2012 | Galpin et al. |
| 2014/0023749 A1 | 1/2014 | Jimenez et al. |
| 2014/0322423 A1 | 10/2014 | Gandhi et al. |
| 2015/0147437 A1 | 5/2015 | Manoury et al. |
| 2015/0173396 A1 | 6/2015 | Gardiner et al. |
| 2015/0289532 A1 | 10/2015 | Chiba et al. |
| 2016/0219894 A1 | 8/2016 | El Soda et al. |
| 2017/0347677 A1 | 12/2017 | Garric et al. |
| 2018/0055064 A1 | 3/2018 | McLeod et al. |
| 2018/0249727 A1 | 9/2018 | Nielsen et al. |
| 2018/0368433 A1* | 12/2018 | Coker ............... A23C 19/0684 |
| 2019/0261641 A1 | 8/2019 | Arechiga et al. |
| 2020/0022379 A1 | 1/2020 | Arechiga et al. |
| 2021/0076696 A1 | 3/2021 | Roustel et al. |

FOREIGN PATENT DOCUMENTS

| | | |
|---|---|---|
| CN | 102090457 | 6/2011 |
| EP | 0755630 | 1/1997 |
| EP | 0951833 | 10/1999 |
| EP | 2647293 | 10/2013 |
| KR | 1407400 | 9/2019 |
| WO | 2009150183 | 12/2009 |
| WO | 2019081577 | 5/2019 |

OTHER PUBLICATIONS

McMahon et al., Cheese (Fourth edition), Chapter 40—Pasta-Filata Cheeses, 2017, pp. 1041-1068 (2017). (Year: 2017).*

McMahon et al.; "Influence of calcium, pH and moisture on protein matrix structure and functionality in direct acidified nonfat mozzarella cheese"; J. Dairy Sci. 88:3754-3763; American Dairy Science Association, 2005—(10) pages.

McMahon et al.; "Pasta-filata cheeses", 2017, Chapter 40 (pp. 1041-1068) in Cheese: Cheese Chemistry Physics and Microbiology. 4th Ed., vol. 2, Cheese Technology and Major Cheese Groups. P.F. Fox, P.L.H. McSweeney, P. Cotter and D.W. Everett, eds, Elsevier Publishers, London—(28) pages.

Yingchen Lin et al.; "Seasonal variation in the composition and processing characteristics of herd milk with varying proportions of milk from spring-calving and autumn-calving cows"; Journal of Dairy Research, Hannah Research Foundation (2017); pp. 444-452—(10) pages.

Guinee et al.; "The effect of fat content on the rheology, microstructure and heat-induced functional characteristics of Cheddar cheese"; International Dairy Journal 10 (2000); pp. 277-288—(12) pages.

McMahon et al.; "Water Partitioning in Mozzarella Cheese and Its Relationship to Cheese Meltability"; J. Dairy Sci. (1999); Journal of Dairy Science vol. 82, No. 7, 1999; pp. 1361-1369—(9) pages.

Oberg et al.; "Microstructure of Mozzarella Cheese During Manufacture"; Food Structure, vol. 12 (1993), pp. 251-258—(8) pages.

* cited by examiner

NATURAL PASTA-FILATA STYLE CHEESE WITH IMPROVED TEXTURE

FIELD OF THE INVENTION

The present disclosure relates to the manufacture of a natural pasta filata style cheese and, more specifically, to the manufacture of a natural pasta filata style cheese having improved textural attributes.

BACKGROUND OF THE INVENTION

Pasta filata style cheese loses its fibrous texture over time. Initially after manufacture, 50% of the total moisture in such cheese can be expressed using centrifugation. During refrigerated storage, the expressible moisture declines such that after approximately 30 days, such cheese has no expressible moisture. This can be explained by the change in microstructure of the cheese. Initially, the protein strands that are the basis for fiber formation are separated by channels containing fat and moisture. The moisture in the channel is gradually absorbed by the protein matrix to the extent it is no longer easily expressed and the fat globules are completely encased by the protein matrix. During refrigerated storage, proteolytic enzymes such as from any residual coagulant and the starter culture act to breakdown the proteins in the cheese. As the amount of intact protein decreases during storage, this weakens the crosslinks between individual proteins that make up the cheese protein matrix and increases the tendency for the proteins to be associated with moisture rather than with each other.

SUMMARY OF THE INVENTION

In one construction, the disclosure provides a method for making natural pasta-filata style cheese comprising the steps of ultra-filtrating milk to at least 4% milk protein, adding a starter culture to milk, adding calcium to the milk before ripening, ripening the milk at a temperature of at least 95° F., adding a rennet enzyme to milk, coagulating the milk, separating the whey from the curd and stretching the curd at a pH of at least 5.25 and at a temperature of at least 130° F.

In another construction, the disclosure provides a method for making a natural string cheese with improved textural attributes comprising the steps of ultra-filtrating milk to at least 4% milk protein, adding a starter culture of Streptococcus to the milk, adding at between 0.01%-0.02% calcium to the milk prior to ripening, ripening the milk at a temperature between 95-105° F., adding a low proteolytic rennet enzyme to the milk, coagulating the milk, separating the whey from the curd, stretching the curd at a pH of between 5.25 and 5.45 and at a temperature of between 130-145" F. and forming the curd.

In another construction, the disclosure provides a method for making a natural string cheese that has expressible serum 30 days after manufacture and refrigerated storage comprising the steps of using milk with at least 4% milk protein, adding calcium prior to renneting, ripening at a temperature of at least 95° F. and stretching at a temperature of at least 130° F. and a pH of at least 5.25.

Other aspects of the disclosure will become apparent by consideration of the detailed description and accompanying drawings.

DETAILED DESCRIPTION OF THE INVENTION

Before any embodiments of the disclosure are explained in detail, it is to be understood that the disclosure is not limited in its application to the details of construction and the arrangement of steps set forth in the following description or illustrated in the following drawings. The disclosure is capable of other constructions and of being practiced or of being carried out in various ways.

The cheesemaking methods described herein provide a pasta filata style cheese with improved textural attributes that are achieved by altering various natural cheesemaking parameters. For example, the fibrous texture or stringiness of the cheese produced is maintained for longer periods of time and the amount of retained serum or juiciness is maintained for longer periods of time, both as compared to conventionally produced cheese. Those longer periods of time include after 30 days, 50 days, 80 days, 100 days, or 120 days, for example.

Figure 1:
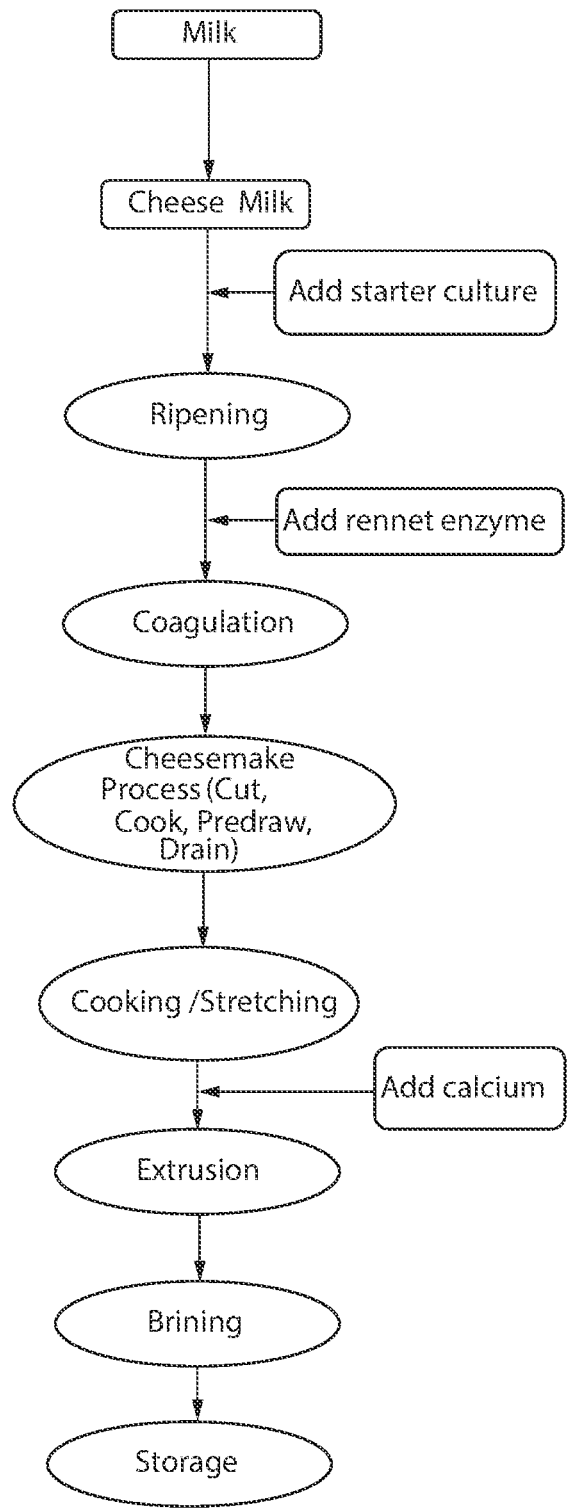
FIG. 1 is a flowchart of a method to manufacture a natural pasta filata style cheese.

With reference to the cheesemaking method of FIG. 1, this method includes the addition of calcium after stretching. The calcium is added at a level of between 0.2%-2.0% and, more specifically, in the range of 0.6%-2.0%, and in the range of 0.6%-1.0%.

This method results in a cheese with higher expressible moisture or serum over a period of time such as at 30 days as compared to conventionally produced cheese where there is generally no measurable expressible serum after 30 days. The amount of serum that can be expressed by centrifuge from the cheese can be tested as is known in the art. The addition of calcium after stretching approximately doubles the length of time in which the juiciness of the cheese is retained as compared to string cheese manufactured without adding calcium before extruding. Cheese so treated with calcium lose their stringiness slower over time and expressible serum at 30 days and 50 days, for example.

To demonstrate changes in textural attributes over time, other textural analysis can be conducted such as hardness, springiness, resilience, cohesiveness, adhesiveness, and chewiness, as is known by those of skill in the art. Such textural analysis demonstrates that the cheese produced in the method of FIG. 1 has improved textural characteristics over a period of time as compared to conventionally produced string cheese. The extent of textural characteristic changes, such as stringiness of the cheese, can be observed visually over time.

The microstructure of the cheese produced from the method of FIG. 1 is altered as compared to conventionally produced string cheese which can be demonstrated using samples fixed in glutaraldehyde/formaldehyde and in using transmission electron microscopy, with the samples embedded in resin, sectioned to approximately 200 nm in thickness and stained with heavy metals, for example. The microstructure of the cheese produced from the method of FIG. 1 (i) has wider fat-serum channels that provide more easily propagated fractures, (ii) has a reduced tendency for the protein matrix to become more hydrated by increasing the protein-protein interactions, (iii) takes longer for the serum around the fat droplets to be absorbed into the protein matrix, (iv) takes longer for the protein matrix to expand and encase the fat globules, (v) has the serum-fat channels remain as separate entities with a thin layer of serum between the fat globules and the protein matrix and (vi) has an increased amount of small serum spaces scattered throughout the protein matrix. The serum-fat channels allow the protein matrix to be pulled apart at these channels and allow for that breakage to be propagated along these channels, thus allowing strings of cheese to be pulled.

One example process of the method of FIG. 1 to produce string cheese is as follows. It should be noted that other natural pasta filata style cheese can also be manufactured using the illustrated process and the specific parameters and components set forth below can be altered. Low moisture part skim mozzarella cheese curd is manufactured from pasteurized milk standardized to 2% milkfat, from a *Streptococcus* bacteria such as *Streptococcus thermophilus* starter culture and from a low proteolytic rennet enzyme such as camel chymosin, for example. The curd is stretched and heated. Calcium, preferably in the form of calcium chloride, is added to the hot cheese in a brine solution after cooking/stretching but before extrusion. The calcium content is in the range of 0.2-1.0%.

The cheese produced from the method of FIG. 1 has altered textural characteristics and a different microstructure enabling the fresh characteristic of the string cheese to be maintained over a longer period of time thus improving textural attributes.

Figure 2:
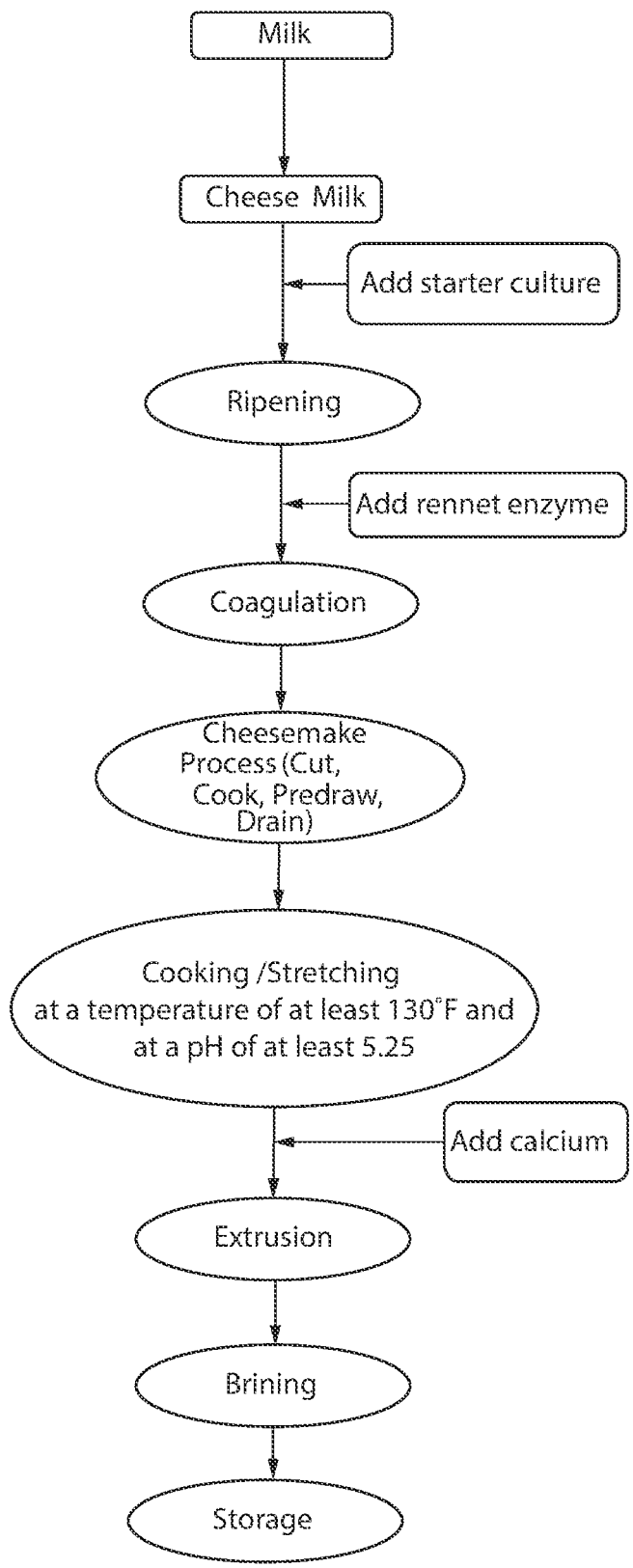
FIG. 2 is a flowchart of second embodiment of a method to manufacture a natural pasta filata style cheese.

Turning now to FIG. 2, a second embodiment of a cheesemaking method to improve textural attributes of a natural pasta filata style cheese is illustrated. This method includes the addition of calcium after stretching at a level of between 0.2%-2.0%, more specifically in the range of 0.6%-1.0%, and more specifically 0.6%. The method includes a curd stretching pH in the range of 5.25-5.45 and, more specifically, in the range of 5.3-5.45. The method includes a curd stretching temperature in the range of 130-140° F., and more specifically 135° F.

This method results in a cheese with higher expressible moisture over a period of time such as at 30 days, 50 days, 80 days, 100 days, or 120 days as compared to conventionally produced cheese and with slower loses in stringiness and expressible serum. The extent of serum that can be expressed by centrifuge from the cheese can be tested as is known in the art. The addition of calcium and the choice of stretching pH and stretching temperature enables the cheese to have expressible serum after 100 days of refrigerated storage.

To demonstrate changes in textural attributes over time, other textural analysis can be conducted such as hardness, springiness, resilience, cohesiveness, adhesiveness, and chewiness as is known by those of skill in the art. Such other textural analysis demonstrates that the cheese produced in the method of FIG. 2 loses its stringiness slower over time as compared to conventionally produced string cheese.

The microstructure of the cheese produced from the method of FIG. 2 is altered as compared to conventionally produced string cheese which can be demonstrated using samples fixed in glutaraldehyde/formaldehyde and imaged using transmission electron microscopy, with the samples embedded in resin, sectioned to approximately 200 nm in thickness and stained with heavy metals, for example. The microstructure of the cheese produced from the method of FIG. 2: (i) keeps the fat/serum channels separate from the protein matrix so that the channels act as points of weakness that allow the cheese to be pulled apart, (ii) maintains the protein matrix as parallel strands that give the cheese increased springiness, and (iii) prevents the whole cheese mass from fusing together.

One example process of the method of FIG. 2 to produce string cheese is as follows. It should be noted that other natural pasta filata style cheese can also be manufactured using the illustrated process and the specific parameters and components set forth below can be altered. Low moisture part skim mozzarella cheese curd is manufactured from pasteurized milk standardized to 2% milkfat, a *Streptococcus* only starter culture such as *Streptococcus thermophilus* and a low proteolytic rennet enzyme such as camel chymosin. After whey draining, when the curd reaches pH 5.4, it is salted with 1%. The curd is placed in a cooker/stretcher and heated to between 135° F. and 145° F., in a hot 5% bring solution. Calcium, preferably in the form of calcium chloride, is added to the hot cheese in the brine solution after cooking/stretching but before extrusion.

The cheese produced from the method of FIG. 2 has altered textural characteristics and a different microstructure enabling the fresh characteristic of the string cheese to be maintained for a longer period of time thus improving textural attributes.

Figure 3:
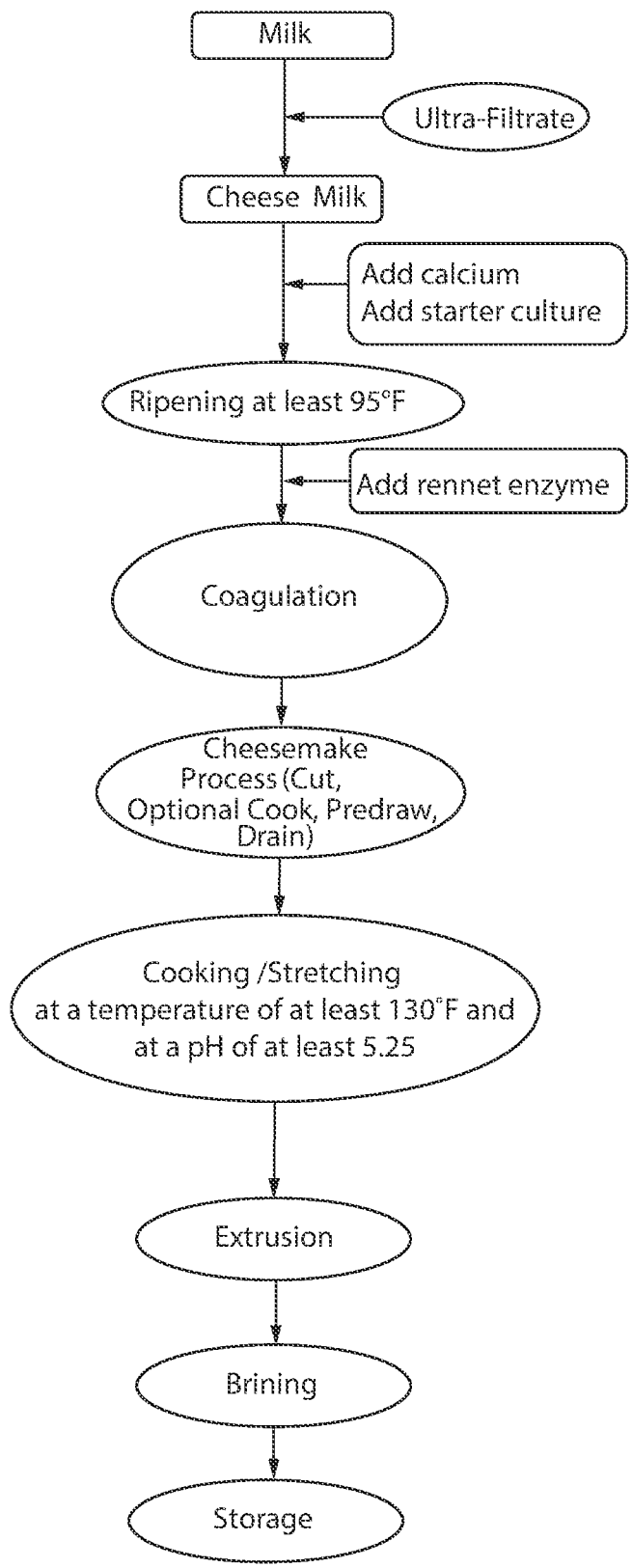
FIG. 3 is a flowchart of a third embodiment of a method to manufacture a natural pasta filata style cheese.

Turning now to FIG. 3, a third embodiment of a cheesemaking method to improve textural attributes of a natural pasta filata style cheese is illustrated. This method includes use of milk with at least 4% milk protein, addition of calcium prior to renneting, ripening at a temperature of at least 95° F., stretching at a temperature of at least 130° F. and stretching at a pH of at least 5.25. The calcium added prior to renneting is greater than 0.01%, and more specifically in the range of 0.01-0.02%. The ripening temperature is at least 95° F., and more specifically, in the range of 95-105° F. The stretching pH is at least 5.25, and more specifically, in the range of 5.25-5.45, and more particularly 5.45. The stretching temperature is at least 130° F., and more specifically, in the range of 130-145° F. and more particularly 145° F.

The cheese produced by the method of FIG. 3 retains expressible serum through at least 100 days of refrigerated storage.

To demonstrate changes in textural attributes over time, other textural analysis can be conducted such as hardness, springiness, resilience, cohesiveness, adhesiveness, and chewiness as is known by those of skill in the art. Such other textural analysis demonstrates that the cheese produced in the process of FIG. 3 loses its stringiness slower over time as compared to conventionally produced string cheese. Stringiness was also observed visually over time by pulling apart the cheese and observing the formation of strings.

The microstructure of the cheese produced from the method of FIG. 3 is altered as compared to conventionally produced string cheese which can be demonstrated using samples fixed in glutaraldehyde/formaldehyde and imaged using transmission electron microscopy, with the samples embedded in resin, sectioned to approximately 200 nm in thickness and stained with heavy metals, for example. The microstructure of the cheese produced from the method of FIG. 3: (i) keeps the fat/serum channels separate from the protein matrix so that the channels act as points of weakness that allow the cheese to be pulled apart, (ii) maintains the protein matrix as parallel strands that give the cheese increased springiness, and (iii) prevents the whole cheese mass from fusing together.

One example process of the method of FIG. 3 to produce string cheese is as follows. It should be noted that other natural pasta filata style cheese can also be manufactured using the illustrated process and the specific parameters and components set forth below can be altered. Skim milk is adjusted by ultra-filtration to about 2× concentration then added to whole milk to produce a higher fat milk of at least 4% with a protein/fat ratio of 1.4, for example. Calcium, preferably in the form of calcium chloride, is added to the milk prior to renneting such as between 0.01-0.02%. A starter culture, such as *Streptococcus thermophilus*, for example, is added. A ripening temperature of 105° F. is utilized. A low proteolytic rennet, such as camel chymosin rennet for example, is added to the milk at a concentration of 3-10 mL, per 1000 lb of milk and coagulated at a temperature of 95° F. The cheese is stretched at a cheese temperature of 145° F. and at a pH of 5.45. Thereafter, the cheese is extruded, brined, and stored.

In this third embodiment, the rate at which protein strands in the cheese become more water-compatible and fuse together so that serum/fat channels remain between them is slowed. The protein-protein interactions are increased, protein-water interactions are reduced and proteolysis during storage is reduced so that protein chains remain intact rather than being broken into shorter chainer that interact more readily with water. With a higher ripening temperature, the amount of rennet can be decreased by approximately 30-80%, for example. Adding calcium to the milk speeds up coagulation and thus reduces the amount of coagulant needed. Increasing the protein content of the milk speeds up coagulation. Increasing the set temperature of the milk speeds up coagulation.

The cheesemaking methods described herein provide a pasta filata style cheese with enhanced textural attributes such as stringiness and juiciness. It should be noted that the sensory characteristics may be affected by the methods disclosed herein but any changes can be suitable altered as is needed.

Various features and advantages of the invention are set forth in the following claims.

What is claimed is:

1. A method for making pasta-filata style cheese comprising the steps:
   ultra-filtrating milk to at least 4% by weight milk protein;
   adding a starter culture to the milk;
   adding calcium to the milk before ripening;
   ripening the milk at a ripening temperature of at least 95° F.;
   adding a low proteolytic rennet enzyme to the milk;
   coagulating the milk at a temperature of at least 95° F. to produce whey and curd;
   separating the whey from the curd; and
   stretching the curd at a pH of at least 5.25 and at a stretching temperature of at least 130° F.

2. The method of claim 1 wherein the pasta-filata style cheese is string cheese.

3. The method of claim 1 and further including the step of testing the cheese after 30 days to confirm expressible serum is present.

4. The method of claim 1 wherein at least 0.01% by weight of the milk of calcium is added.

5. The method of claim 1 wherein 0.01 to 0.02% by weight of the milk of calcium is added.

6. The method of claim 1 wherein the ripening temperature is between 95-105° F.

7. The method of claim 1 wherein the stretching temperature is between 130-145° F.

8. The method of claim 1 wherein the milk is ultra-filtrated to a protein/fat ratio of at least 1.4.

9. The method of claim 1 wherein the calcium is added to the milk prior to the ripening.

10. The method of claim 1 wherein in the step of stretching the curd, calcium is added.

11. The method of claim 1 wherein in the step of coagulating the milk, a temperature of between 95-105° F. is maintained.

12. The method of claim 1 wherein the ripening temperature is at least 100° F.

13. The method of claim 1 wherein the coagulation temperature is at least 100° F.

* * * * *